US012666459B2

(12) United States Patent
Lu et al.

(10) Patent No.: US 12,666,459 B2
(45) Date of Patent: Jun. 23, 2026

(54) TRANSMISSION METHOD AND APPARATUS

(71) Applicant: VIVO MOBILE COMMUNICATION CO., LTD., Dongguan (CN)

(72) Inventors: Zhi Lu, Dongguan (CN); Xiaohang Chen, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 466 days.

(21) Appl. No.: 18/106,947

(22) Filed: Feb. 7, 2023

(65) Prior Publication Data

US 2023/0189324 A1      Jun. 15, 2023

Related U.S. Application Data

(63) Continuation of application No. PCT/CN2021/111226, filed on Aug. 6, 2021.

(30) Foreign Application Priority Data

Aug. 7, 2020      (CN) .......................... 202010791659.9

(51) Int. Cl.
| | |
|---|---|
| *H04W 72/563* | (2023.01) |
| *H04L 5/00* | (2006.01) |
| *H04W 72/1268* | (2023.01) |
| *H04W 72/21* | (2023.01) |

(52) U.S. Cl.
CPC ......... *H04W 72/563* (2023.01); *H04L 5/0053* (2013.01); *H04L 5/0064* (2013.01); *H04W 72/1268* (2013.01); *H04W 72/21* (2023.01)

(58) Field of Classification Search
None
See application file for complete search history.

(56) References Cited

U.S. PATENT DOCUMENTS

| | | | | |
|---|---|---|---|---|
| 11,139,926 | B2* | 10/2021 | Aiba ..................... | H04W 76/11 |
| 2018/0310257 | A1* | 10/2018 | Papasakellariou .... | H04W 52/08 |
| 2019/0068317 | A1* | 2/2019 | Babaei .................. | H04W 72/20 |
| 2020/0007296 | A1* | 1/2020 | Papasakellariou .... | H04L 5/0042 |
| 2020/0305147 | A1* | 9/2020 | Lee ........................ | H04L 1/1664 |
| 2021/0250134 | A1* | 8/2021 | Islam ................... | H04B 7/0626 |

(Continued)

FOREIGN PATENT DOCUMENTS

| | | |
|---|---|---|
| CN | 109787712 A | 5/2019 |
| CN | 110035535 A | 7/2019 |

(Continued)

OTHER PUBLICATIONS

International Search Report issued in corresponding International Application No. PCT/CN2021/111226, mailed Nov. 10, 2021, 4 pages.

(Continued)

*Primary Examiner* — Steve R Young
(74) *Attorney, Agent, or Firm* — IPX PLLC

(57) ABSTRACT

A transmission method and an apparatus are provided. The method includes: obtaining first-priority Uplink Control Information (UCI) and second-priority UCI; and multiplexing the first-priority UCI and the second-priority UCI on a Physical Uplink Shared CHannel (PUSCH) for transmission, wherein a priority of the PUSCH is a first priority or a second priority.

20 Claims, 7 Drawing Sheets

(56) References Cited

U.S. PATENT DOCUMENTS

| | | | |
|---|---|---|---|
| 2022/0029753 A1* | 1/2022 | Papasakellariou | .... H04L 1/1896 |
| 2023/0224081 A1* | 7/2023 | Chen | ..................... H04L 1/1861 |
| | | | 370/329 |
| 2024/0015747 A1* | 1/2024 | Gao | .................. H04W 72/1268 |

FOREIGN PATENT DOCUMENTS

| | | |
|---|---|---|
| CN | 111278143 A | 6/2020 |
| CN | 111314033 A1 | 6/2020 |
| WO | 2020033941 A1 | 2/2020 |

OTHER PUBLICATIONS

Huawei et al, "On transmission of PUSCH and UCI in the same slot", 3GPP TSG RAN WG1 Meeting #88 R1-1701650, Feb. 2017, 4 pages.
ZTE, "UCI multiplexing on PUSCH", 3GPP TSG RAN WG1 Meeting #89 R1-1707173, May 19, 2017, 5 pages.
First Office Action issued in related Chinese Application No. 202010791659.9, mailed Jul. 7, 2022, 8 pages.
Second Office Action issued in related Chinese Application No. 202010791659.9, mailed Dec. 5, 2022, 6 pages.

* cited by examiner

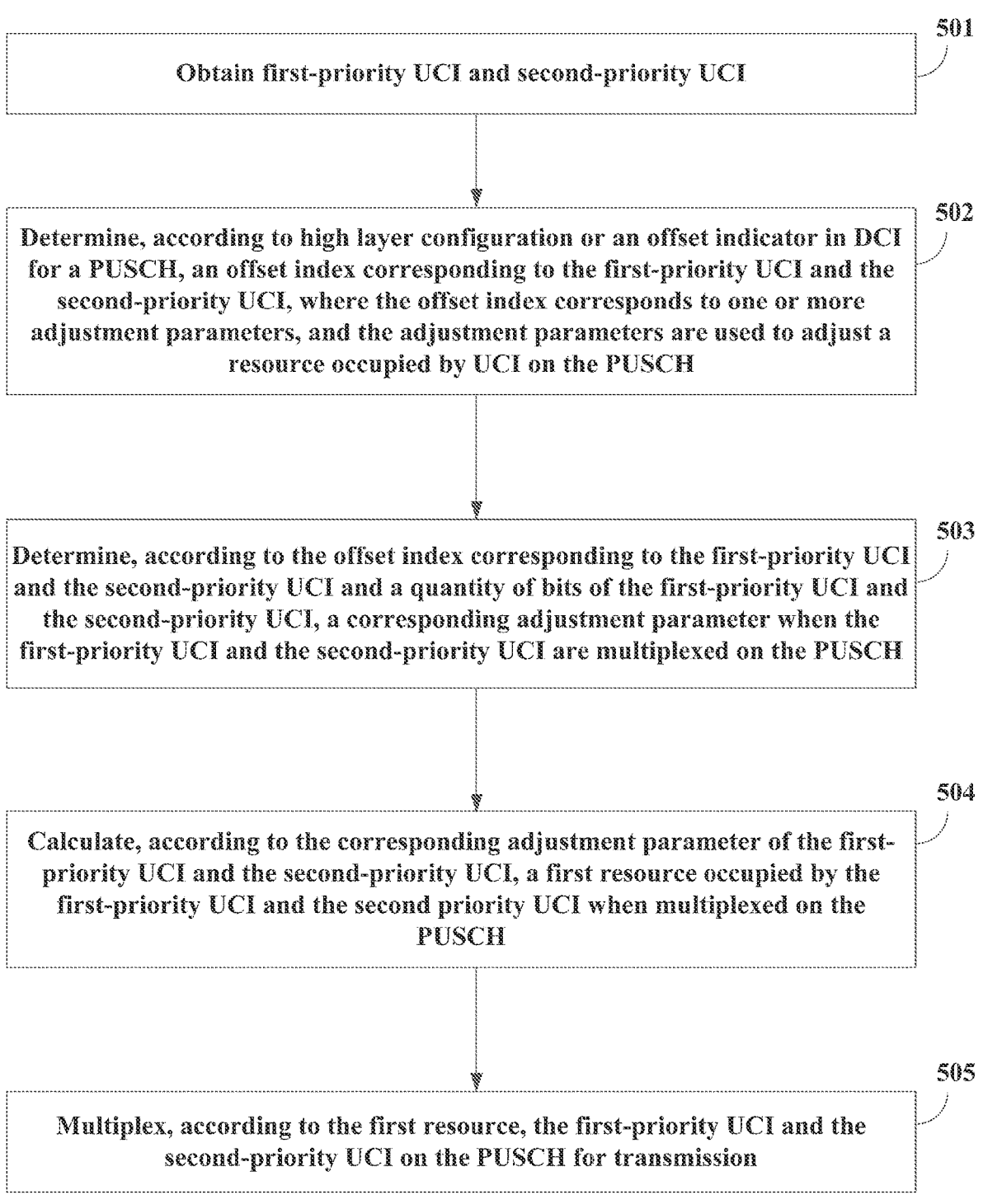

501

Obtain first-priority UCI and second-priority UCI

502

Determine, according to high layer configuration or an offset indicator in DCI for a PUSCH, an offset index corresponding to the first-priority UCI and the second-priority UCI, where the offset index corresponds to one or more adjustment parameters, and the adjustment parameters are used to adjust a resource occupied by UCI on the PUSCH

503

Determine, according to the offset index corresponding to the first-priority UCI and the second-priority UCI and a quantity of bits of the first-priority UCI and the second-priority UCI, a corresponding adjustment parameter when the first-priority UCI and the second-priority UCI are multiplexed on the PUSCH

504

Calculate, according to the corresponding adjustment parameter of the first-priority UCI and the second-priority UCI, a first resource occupied by the first-priority UCI and the second priority UCI when multiplexed on the PUSCH

505

Multiplex, according to the first resource, the first-priority UCI and the second-priority UCI on the PUSCH for transmission

FIG. 5

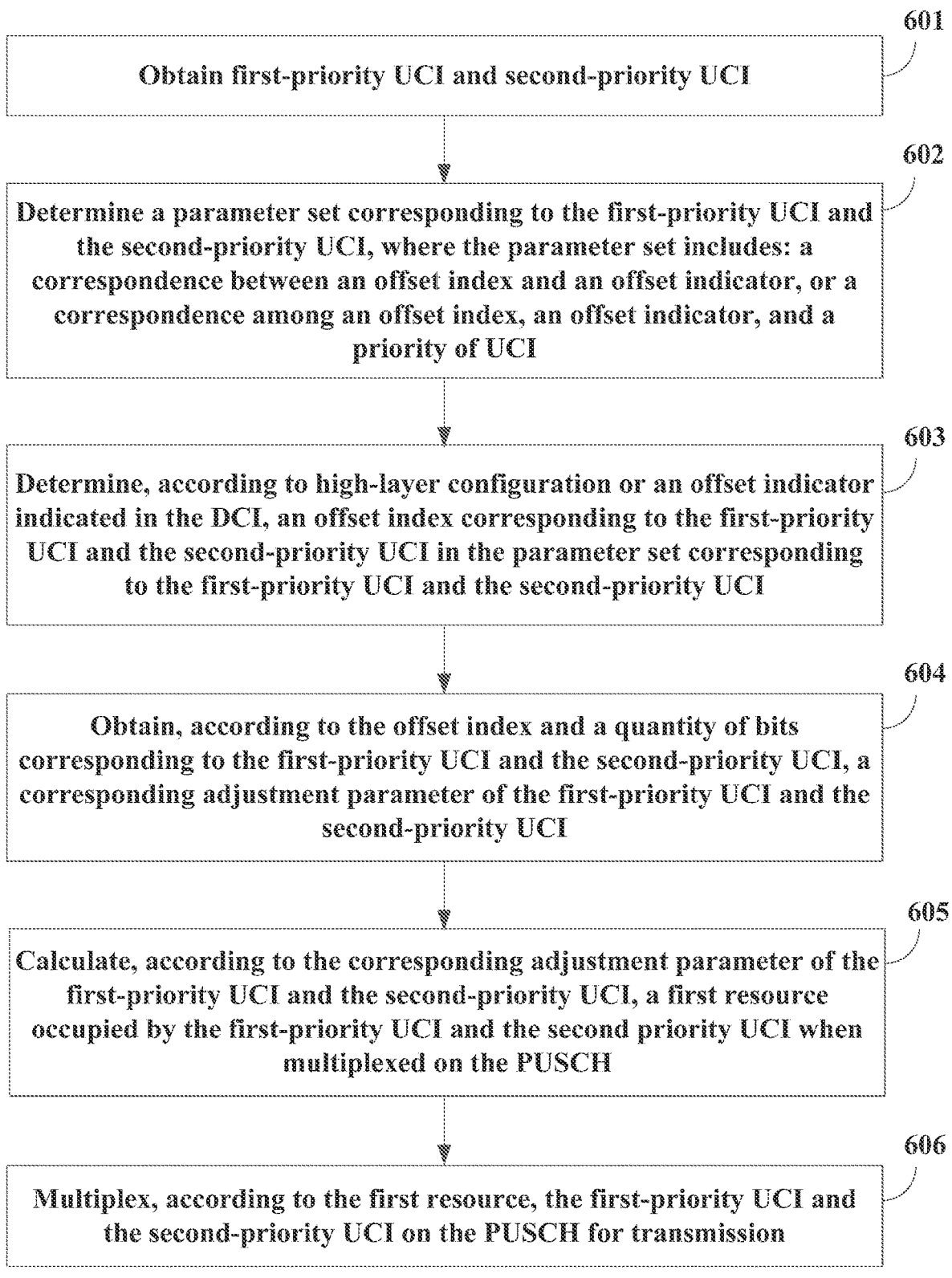

601

Obtain first-priority UCI and second-priority UCI

602

Determine a parameter set corresponding to the first-priority UCI and the second-priority UCI, where the parameter set includes: a correspondence between an offset index and an offset indicator, or a correspondence among an offset index, an offset indicator, and a priority of UCI

603

Determine, according to high-layer configuration or an offset indicator indicated in the DCI, an offset index corresponding to the first-priority UCI and the second-priority UCI in the parameter set corresponding to the first-priority UCI and the second-priority UCI

604

Obtain, according to the offset index and a quantity of bits corresponding to the first-priority UCI and the second-priority UCI, a corresponding adjustment parameter of the first-priority UCI and the second-priority UCI

605

Calculate, according to the corresponding adjustment parameter of the first-priority UCI and the second-priority UCI, a first resource occupied by the first-priority UCI and the second priority UCI when multiplexed on the PUSCH

606

Multiplex, according to the first resource, the first-priority UCI and the second-priority UCI on the PUSCH for transmission

FIG. 6

TRANSMISSION METHOD AND APPARATUS

CROSS-REFERENCE TO RELATED APPLICATIONS

This application is a continuation of International Application No. PCT/CN2021/111226, filed on Aug. 6, 2021, which claims priority to Chinese Patent Application No. 202010791659.9, filed on Aug. 7, 2020. The entire contents of each of the above-identified applications are expressly incorporated herein by reference.

TECHNICAL FIELD

This application relates to the field of communications technologies, and specifically relates to a transmission method and apparatus.

BACKGROUND

Compared with a previous mobile communications system, a mobile communications system of 5th Generation (5G) mobile communications technologies need to adapt to more diverse scenarios and service requirements. Main scenarios of 5G include: enhanced Mobile BroadBand (eMBB), Ultra-Reliable and Low Latency Communication (URLLC), and massive Machine Type of Communication (mMTC). These scenarios require high reliability, low latency, a large bandwidth, and wide coverage for the system. Some terminals may support different services. For example, a terminal may support both a URLLC service and a large-capacity and high-rate eMBB service. During transmission of an eMBB service, a URLLC service may need to be transmitted. A time domain for transmitting the eMBB and a time domain for transmitting the URLLC may be overlapped. Generally, to maintain an uplink single-carrier characteristic, when transmission through multiple overlapping Physical Uplink Control CHannel (PUCCH) exists in one time slot, the single-carrier characteristic of a User Equipment (UE) will be destroyed. Therefore, Uplink Control Information (UCI) of different services may need to be multiplexed. This way, UCI information carried by the PUCCH will be multiplexed on a Physical Uplink Shared CHannel (PUSCH) for transmission, as shown in FIG. 1.

When a time domain of a high-priority UpLink (UL) channel overlaps a time domain of a low-priority UL channel, a terminal discards the low-priority UL channel and transmits only the high-priority UL channel, thus ensuring transmission on high-priority channel. However, this leads to a decrease in spectrum efficiency of the low-priority UL channel.

SUMMARY

Embodiments of this application provide a transmission method and apparatus.

According to a first aspect, a transmission method is provided, applied to a terminal and including:

obtaining first-priority UCI and second-priority UCI; and multiplexing the first-priority UCI and the second-priority UCI on a physical uplink shared channel (PUSCH) for transmission, where a priority of the PUSCH is a first priority or a second priority.

According to a second aspect, a transmission apparatus is provided, applied to a terminal and including:

a first obtaining module, configured to obtain first-priority UCI and second priority-UCI; and a multiplexing module, configured to multiplex the first-priority UCI and the second-priority UCI on a PUSCH for transmission, where a priority of the PUSCH is a first priority or a second priority.

According to a third aspect, a terminal is provided, including: a processor, a memory, and a program that is stored in the memory and that can run on the processor, where when the program is executed by the processor, the steps of the transmission method according to the first aspect are implemented.

According to a fourth aspect, a readable storage medium is provided, where the readable storage medium stores a program or an instruction, and when the program or the instruction is executed by a processor, the steps of the transmission method according to the first aspect are implemented.

According to a fifth aspect, a program product is provided, where the program product is stored in a nonvolatile storage medium, and the program product is executed by at least one processor to implement steps of a processing method according to the first aspect.

According to a sixth aspect, a chip is provided, where the chip includes a processor and a communications interface, the communications interface is coupled to the processor, and the processor is configured to run a program or an instruction to implement a method according to the first aspect.

BRIEF DESCRIPTION OF DRAWINGS

FIG. 5 is a third schematic diagram of a transmission method according to an embodiment of this application;

FIG. 6 is a fourth schematic diagram of a transmission method according to an embodiment of this application;

DETAILED DESCRIPTION

The following describes the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first," "second," and the like in the specification and claims of this application are used to distinguish between similar objects instead of describing a designated order or sequence. It should be understood that, data used in this way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, "and" in the specification and claims represents at least one of connected objects. Symbol "/" generally represents an "or" relationship between associated objects. It should be noted that the technology described in the embodiments of this application is not limited to a Long Term Evolution (LTE)/LTE-Advanced (LTE-A) system, and may also be used in various wireless communications systems, such as Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and other systems. The terms "system" and "network" in the embodiments of this application may be used interchangeably. The described technologies can be applied to both the systems and the radio technologies mentioned above as well as to other systems and radio technologies. However, in the following descriptions, a New Radio (NR) system is described for an illustration purpose, and NR terms are used in most of the following descriptions, although these technologies may also be applied to other applications than an NR system application, such as a $6^{th}$ Generation (6G) communications system.

Figure 1:
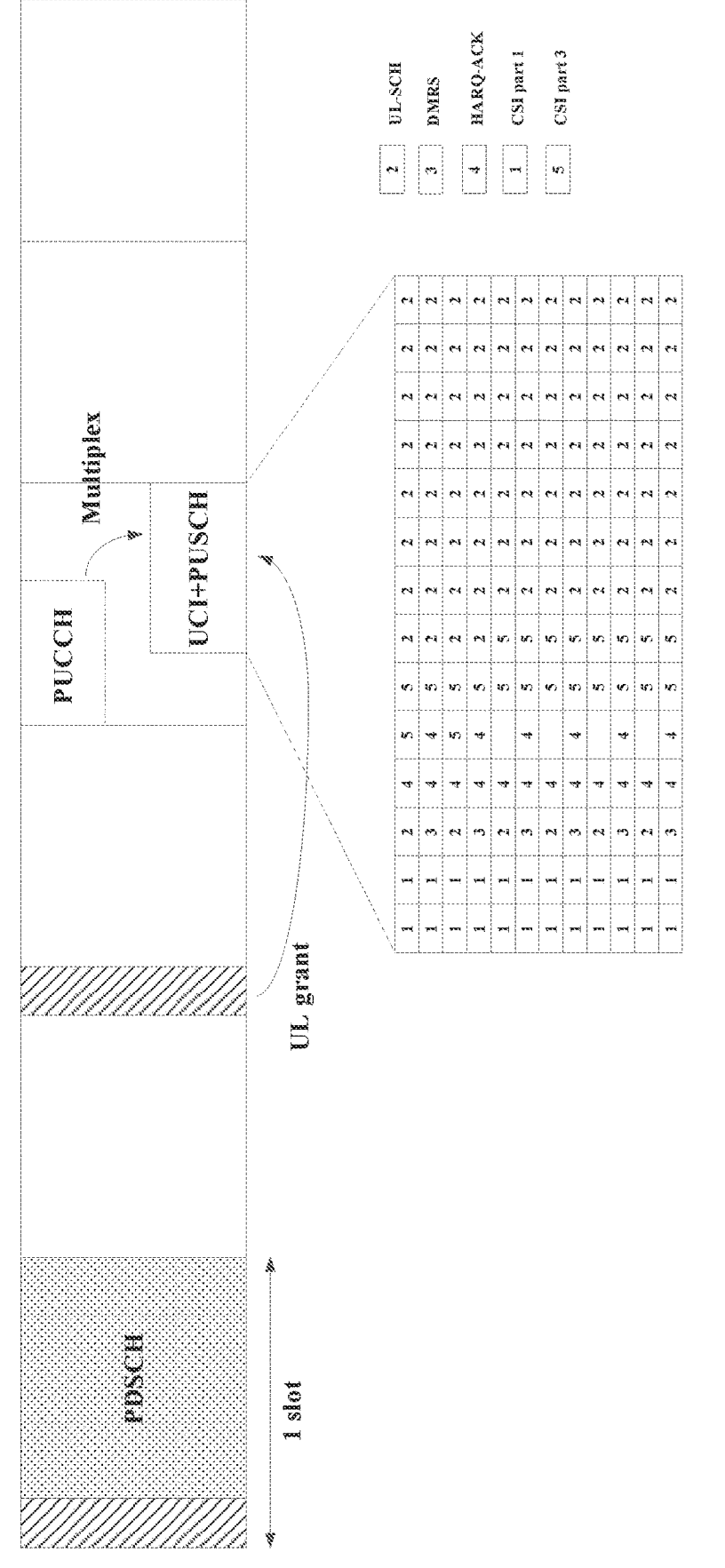
FIG. 1 is a schematic diagram of UCI multiplexed on a PUSCH.
Figure 2:
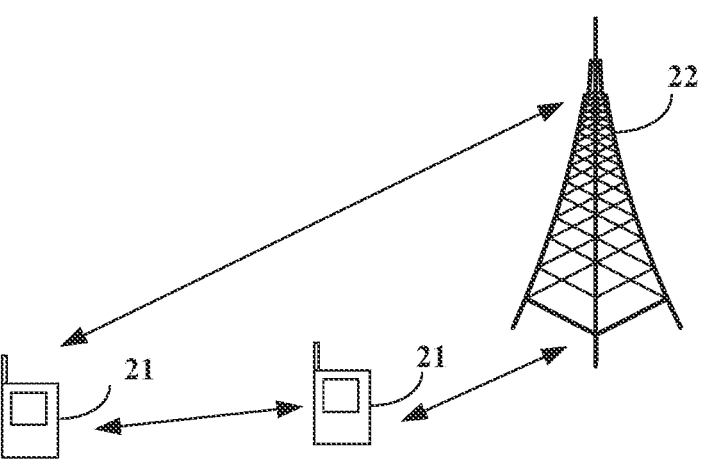
FIG. 2 is a block diagram of a wireless communications system to which an embodiment of this application is applied.

FIG. 2 is a block diagram of a wireless communications system to which embodiments of this application can be applied. The wireless communications system includes a terminal 21 and a network side device 22. The terminal 21 may also be referred to as a terminal device or User Equipment (UE). The terminal 21 may be a terminal side device such as a mobile phone, a tablet personal computer, a laptop computer or a notebook computer, a Personal Digital Assistant (PDA), a palmtop computer, a netbook, an Ultra-Mobile Personal Computer (UMPC), a Mobile Internet Device (MID), a wearable device, a Vehicle User Equipment (VUE), or a Pedestrian User Equipment (PUE). The wearable device includes a bracelet, a headset, glasses, and the like. It should be noted that a specific type of the terminal 21 is not limited in the embodiments of this application. The network side device 22 may be a base station or a core network. The base station may be referred to as a NodeB, an evolved Node B (eNB), an access point, a Base Transceiver Station (BTS), a radio base station, a radio transceiver, a Basic Service Set (BSS), an Extended Service Set (ESS), a home NodeB, a home evolved NodeB, a WLAN access point, a WiFi node, a Transmission Reception Point (TRP), or another suitable term in the field provided that a same technical effect is achieved. The base station is not limited to a specific technical term. It should be noted that, in this application, only a base station in an NR system is used as an example, but a specific type of the base station is not limited.

A transmission method and apparatus provided in embodiments of this application are described in detail below through embodiments and application scenarios thereof and with reference to accompanying drawings.

Figure 3:
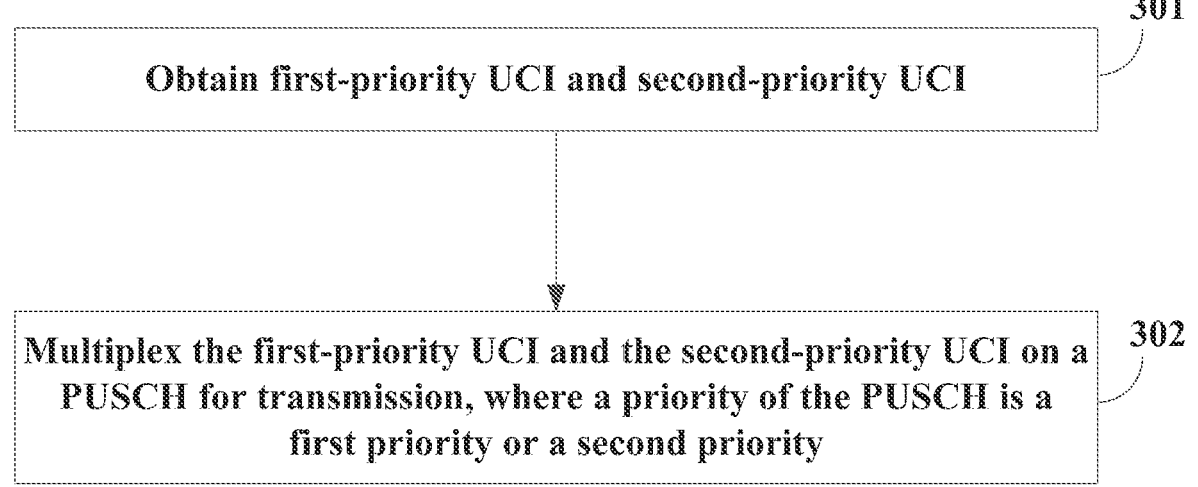
FIG. 3 is a first schematic diagram of a transmission method according to an embodiment of this application.

Referring to FIG. 3, an embodiment of this application provides a transmission method, executed by a terminal, and the method includes: step 301 and step 302.

Step 301: Obtain first-priority UCI and second-priority UCI; and

Step 302: Multiplex the first-priority UCI and the second-priority UCI on a PUSCH for transmission, where a priority of the PUSCH is a first priority or a second priority.

The first priority (or a priority index 1) may be a high priority, the second priority (or a priority index 0) may be a low priority, or the second priority may be a low priority and the first priority may be a high priority.

In this embodiment of this application, a priority index of the PUSCH is indicated by a priority indication field of Downlink Control Information (DCI), or the priority of the PUSCH is configured by a higher layer.

For example, if the priority indication field of the DCI is 0, the priority of the PUSCH scheduled by the DCI is a low priority; and if the priority indication field of the DCI is 1, the priority of the PUSCH scheduled by the DCI is a high priority. In some implementations, if the priority indicator field of the DCI is 0, the priority of the PUSCH scheduled by the DCI is a high priority; and if the priority indicator field of the DCI is 1, the priority of the PUSCH scheduled by the DCI is a low priority.

If the corresponding PUSCH (configured grant PUSCH) is configured, the priority of the PUSCH scheduled by the DCI may be obtained through high layer configuration (such as Radio Resource Control (RRC) configuration).

If the priority indication field is not configured in the DCI, a PUSCH with a low priority is assumed.

In this embodiment of this application, UCI with different priorities may be multiplexed on the PUSCH simultaneously, so that UCI with a low-priority service may be prevented from being discarded.

Figure 4:
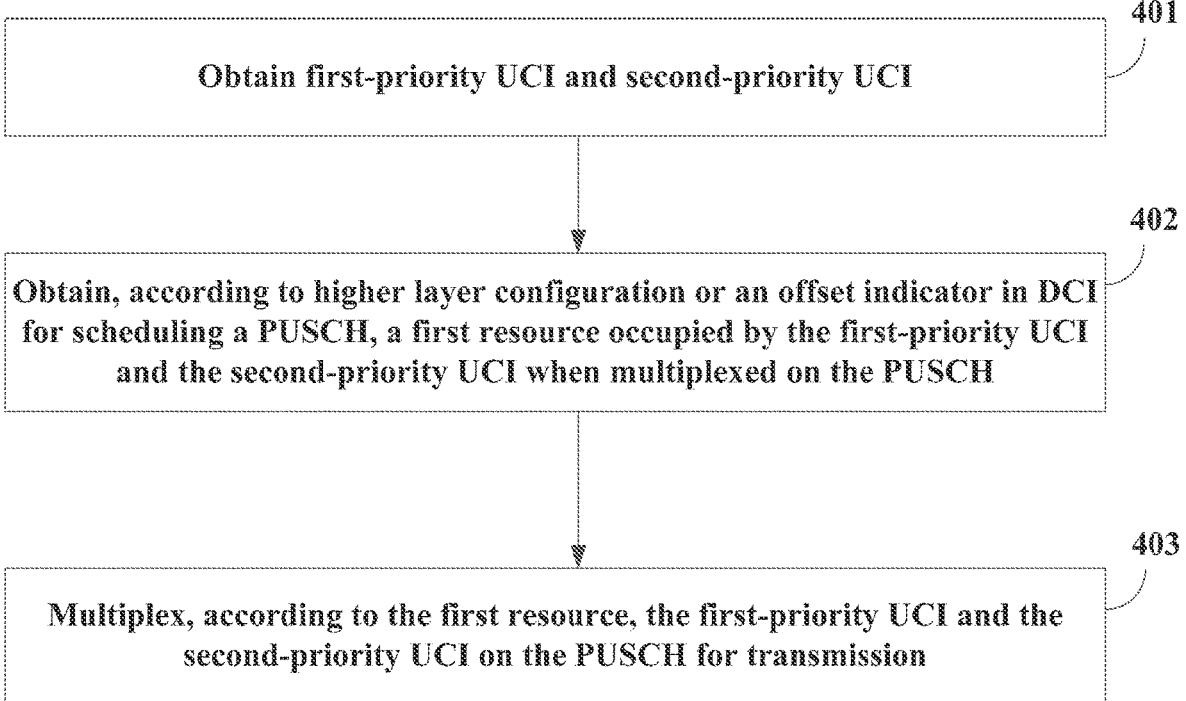
FIG. 4 is a second schematic diagram of a transmission method according to an embodiment of this application.

Referring to FIG. 4, an embodiment of this application provides a transmission method, executed by a terminal, and the method includes: step 401 to step 403.

Step 401: Obtain first-priority UCI and second-priority UCI; and

Step 402: Obtain, according to higher layer configuration or an offset indicator in DCI for scheduling a PUSCH, a first resource occupied by the first-priority UCI and second-priority UCI when multiplexed on the PUSCH.

The offset indicator may be represented by a β offset indicator (beta_offset indicator), and the terminal may adjust, based on the offset indicator, of the number of resources occupied by UCI multiplexed on the PUSCH, so that a code rate of UCI multiplexed on the PUSCH may be adjusted.

The first resource may be a Resource Element (RE), but is not limited to thereto.

Step 403: Multiplex, according to the first resource, the first-priority UCI and the second-priority UCI on the PUSCH for transmission.

In this embodiment of this application, UCI with different priorities may be multiplexed on the PUSCH simultaneously, so that UCI with a low-priority service may be prevented from being discarded.

Referring to FIG. 5, an embodiment of this application provides a transmission method, executed by a terminal, and the method includes: step 501 to step 505.

Step 501: Obtain first-priority UCI and second-priority UCI.

Step 502: Determine, according to high layer configuration or an offset indicator in DCI for the PUSCH, an offset index corresponding to the first-priority UCI and the second-priority UCI, where the offset index corresponds to one or more adjustment parameters, and the adjustment parameters are used to adjust a resource occupied by UCI on the PUSCH.

The offset index may be expressed by an offset index. For example, the offset indexes include: a first offset index, a second offset index, a third offset index, and a fourth offset index, or the offset indexes include: a first offset index to an eighth offset index, or the offset indexes include a first offset index to a twelfth offset index. It can be understood that the number of the offset indexes is not specifically limited in this embodiment.

It can be understood that the number of bits of an offset indication field in the DCI may be determined according to the number of configured offset indexes.

For example, each offset index corresponds to seven adjustment parameters, and the seven adjustment parameters respectively correspond to $$I_{offest,0}^{HARQ-ACK}, I_{offest,1}^{HARQ-ACK}, I_{offest,2}^{HARQ-ACK}, I_{offest,0}^{CSI-1}, I_{offest,0}^{CSI-2}, I_{offest,1}^{CSI-1}, I_{offest,1}^{CSI-2}.$$

For example, the first offset index indicates seven values $$\{I_{offest,0}^{HARQ-ACK}, I_{offest,1}^{HARQ-AC}, I_{offest,2}^{HARQ-ACK}, I_{offest,0}^{CSI-1}, I_{offest,0}^{CSI-2}, I_{offest,1}^{CSI-1}, I_{offest,1}^{CSI-2}\},$$

and
the second offset index indicates seven values $$\{I_{offest,0}^{HARQ-ACK}, I_{offest,1}^{HARQ-ACK}, I_{offest,2}^{HARQ-ACK}, I_{offest,0}^{CSI-1}, I_{offest,0}^{CSI-2}, I_{offest,1}^{CSI-1}, I_{offest,1}^{CSI-2}\}.$$

It should be noted that some of the seven values indicate by the first offset index and some of the seven values indicated by the second offset index may be the same or different.

Step 503: Determine, according to the offset index corresponding to the first-priority UCI and the second-priority UCI and the number of bits of the first-priority UCI and the second-priority UCI, a corresponding adjustment parameter when the first-priority UCI and the second-priority UCI are multiplexed on the PUSCH.

In this embodiment of this application, UCI with different priorities may be multiplexed on the PUSCH simultaneously, so that UCI with a low-priority service may be prevented from being discarded.

For example, the following describes how to determine the corresponding adjustment parameter according to the offset index and the number of bits of UCI, the adjustment parameters include:

$$\left(I_{offest,0}^{HARQ-ACK}, I_{offest,1}^{HARQ-ACK} \text{ or } I_{offest,2}^{HARQ-ACK}\right),$$

$$\left(I_{offest,0}^{CSI-1} \text{ or } I_{offest,0}^{CSI-2}\right), \left(I_{offest,1}^{CSI-1} \text{ or } I_{offest,1}^{CSI-2}\right).$$

Corresponding to different quantities of bits of the UCI, each offset index may correspond to seven adjustment parameters. When a UE performs UCI multiplexing on the PUSCH, the UE will select corresponding adjustment parameters according to the number of bits of different types of the UCI and apply the adjustment parameters to corresponding resource calculation formulas (formulas 1-5 to be introduced below) for resource calculation.

The types of the UCI may include: HARQ-ACK, Channel State Information (CSI) part 1, and CSI part 2, but are not limited to thereto.

(1) $I_{offest,0}^{HARQ-ACK}$:

When the number of HARQ-ACK bits (Hybrid automatic repeat request acknowledgement, HARQ-ACK) is (OACK) $\leq 2$,
  that is, when the number of HARQ-ACK bits is less than or equal to 2, an adjustment parameter corresponding to the HARQ-ACK is $$I_{offest,0}^{HARQ-ACK}.$$

(2) $I_{offest,1}^{HARQ-ACK}$:

When the number of HARQ-ACK bits is $3 \leq OACK \leq 11$,
  that is, when the number of HARQ-ACK bits is greater than or equal to 3 and less than or equal to 11, an adjustment parameter corresponding to the HARQ-ACK is $$I_{offest,1}^{HARQ-ACK}.$$

(3) $I_{offest,2}^{HARQ-ACK}$:

When the number of HARQ-ACK bits is OACK>11,
  that is, when the number of HARQ-ACK bits is greater than 11, an adjustment parameter corresponding to the HARQ-ACK is $$I_{offest,2}^{HARQ-ACK}.$$

(4) $I_{offest,0}^{CSI-1}$:

When the number of bits for CSI part 1 is (OCSI)_part$\leq 11$,
  that is, when the number of bits for CSI part 1 is less than or equal to 11, an adjustment parameter corresponding to the CSI part 1 is $$I_{offest,0}^{CSI-1}.$$

(5) $I_{offest,0}^{CSI-2}$:

When the number of bits for CSI part 2 is OCSI_part$\leq 11$,
  that is, when the number of bits for CSI part 2 is less than or equal to 11, an adjustment parameter corresponding to the CSI part 2 is $$I_{offest,0}^{CSI-2}.$$

(6) $I_{offest,1}^{CSI-1}$:

When the number of bits for CSI part 1 is OCSI_part1>11, that is, when the number of bits for CSI part 1 is greater than 11, an adjustment parameter corresponding to the CSI part 1 is $$I_{offest,1}^{CSI-1}.$$

(7) $I_{offest,1}^{CSI-2}$:

When the number of bits for CSI part 2 is OCSI_part2>11, that is, when the number of bits for CSI part 2 is greater than 11, an adjustment parameter corresponding to the CSI part 2 is $$I_{offest,1}^{CSI-2}.$$

Step 504: Calculate, according to the corresponding adjustment parameter of the first-priority UCI and the second-priority UCI, a first resource occupied by the first-priority UCI and the second priority UCI when multiplexed on the PUSCH.

In this embodiment of this application, calculation is made according to the following formulas.

(1) In a case that the HARQ-ACK is multiplexed on the PUSCH with an UpLink Shared CHannel (UL-SCH), the number of coded symbols $Q'_{ACK}$ in each layer is calculated by the following formula 1:

$$Q'_{ACK} = \min\left\{ \left\lceil \frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=l_0}^{N_{symb,all}^{PUSCH}-1} M_{sc}^{UCI}(l) \right\rceil \right\}$$ formula 1

$O_{ACK}$ is the number of CRC bits for HARQ-ACK, if $O_{ACK}\geq360$, $L_{ACK}=11$, otherwise $L_{ACK}$ is the number of Cyclic Redundancy Check (CRC) bits for the HARQ-ACK.

$$\beta_{offest}^{PUSCH} = \beta_{offest}^{HARQ-ACK},$$

a value of the formula is $$I_{offest,0}^{HARQ-ACK}, I_{offest,1}^{HARQ-ACK}, \text{ or } I_{offest,2}^{HARQ-ACK},$$

which is determined according to the actual number of HARQ-ACK bits.

$C_{UL-SCH}$ is the number of code blocks for UL-SCH. $K_r$ is the r-th code block size.

$$M_{SC}^{PUSCH}$$

is the scheduled bandwidth of the PUSCH transmission and expressed as the number of subcarriers.

$$M_{SC}^{PT-RS}(l)$$

is the number of subcarriers in Orthogonal Frequency Division Multiplex (OFDM) symbol l that carries Phase-Tracking Reference Signal (PTRS).

$$M_{SC}^{UCI}(l)$$

is the number of resource elements that can be used for transmission of UCI in the OFDM symbol l.

$$l = 0, 1, 2, \dots, N_{symb,all}^{PUSCH} - 1.$$

$$N_{symb,all}^{PUSCH}$$

is the total number of OFDM symbols, including all OFDM symbols used for a DeModulation Reference Signal (DMRS).

For any OFDM symbol carrying the DMRS, $$M_{SC}^{UCI}(l) = 0.$$

For any OFDM symbol that does not carry the DMRS, $$M_{SC}^{UCI}(l) = M_{SC}^{PUSCH} - M_{SC}^{PT-RS}(l).$$

α is a parameter "scaling" configured by a higher layer. $l_0$ is a first OFDM symbol index, after a first DMRS symbol, that does not carry the DMRS.

(2) In a case that the HARQ-ACK is multiplexed on the PUSCH without an UL-SCH, the number of coded symbols in each layer is calculated by the following formula 2:

$$Q'_{ACK} = \min\left\{ \left\lceil \frac{(O_{ACK} + L_{ACK}) \cdot \beta_{offset}^{PUSCH}}{R \cdot Q_m} \right\rceil, \left\lceil \alpha \cdot \sum_{l=l_0}^{N_{symb,all}^{PUSCH}-1} M_{sc}^{UCI}(l) \right\rceil \right\}$$ formula 2

$O_{ACK}$ is the number of HARQ-ACK bits, if $O_{ACK}\geq360$, $L_{ACK}=11$, otherwise $L_{ACK}$ is the number of CRC bits for HARQ-ACK.

9 | 10

$$\beta_{offest}^{PUSCH} = \beta_{offest}^{HARQ\text{-}ACK},$$

a value of the formula is $$I_{offest,0}^{HARQ\text{-}ACK}, I_{offest,1}^{HARQ\text{-}ACK}, \text{ or } I_{offest,2}^{HARQ\text{-}ACK},$$

which is determined according to the actual number of HARQ-ACK bits.

$$M_{SC}^{PT\text{-}RS}(l)$$

is the number of subcarriers in OFDM symbol l carrying a PTRS.

$$M_{SC}^{UCI}(l)$$

is the number of resource elements that can be used for transmission of UCI in OFDM symbol l.

$$l = 0, 1, 2, \ldots, N_{symb,all}^{PUSCH} - 1.$$

$$N_{symb,all}^{PUSCH}$$

is the number of OFDM symbols, including all OFDM symbols used for DMRS.

For any OFDM symbol carrying the DMRS, $$M_{SC}^{UCI}(l) = 0.$$

For any OFDM symbol that does not carry the DMRS, M $$M_{SC}^{UCI}(l) = M_{SC}^{PUSCH} - M_{SC}^{PT\text{-}RS}(l).$$

α is a parameter "scaling" configured by a higher layer.

$l_0$ is a first OFDM symbol index, after a first DMRS symbol, that does not carry the DMRS.

R is a code rate of the PUSCH.

$Q_m$ is a modulation order of the PUSCH.

(3) In a case that the CSI part 1 is multiplexed on the PUSCH with an UL-SCH, the number of coded symbols in each layer is calculated b the following formula 3:

$$Q'_{CSI-1} = \min\left\{ \left\lceil \frac{(O_{CSI-1} + L_{CSI-1}) \cdot \beta_{offset}^{PUSCH} \cdot \sum_{l=0}^{N_{symb,all}^{PUSCH}-1} M_{sc}^{UCI}(l)}{\sum_{r=0}^{C_{UL\text{-}SCH}-1} K_r} \right\rceil, \right. \qquad \text{formula 3}$$

-continued $$\left. \left\lceil \alpha \cdot \sum_{l=0}^{N_{symb,all}^{PUSCH}-1} M_{sc}^{UCI}(l) \right\rceil - Q'_{ACK} \right\}$$

$O_{CSI-1}$ is the number of bits for CSI part 1, if $O_{CSI-1} \geq 360$, $L_{CSI-1} = 11$, otherwise $L_{CSI-1}$ is of the number of CRC bits for CSI part 1.

$$\beta_{offest}^{PUSCH} = \beta_{offest}^{CSI\text{-}part1},$$

a value of the formula is $$I_{offest,0}^{CSI-1} \text{ or } I_{offest,1}^{CSI-1},$$

which is determined according to the actual number of bits for CSI part 1.

$C_{UL\text{-}SCH}$ is the number of code blocks for UL-SCH. $K_r$ is a size of an $r^{th}$ code block.

$$M_{SC}^{PUSCH}$$

is a scheduling bandwidth for transmission of a PUSCH and is represented by the number of subcarriers.

$$M_{SC}^{PT\text{-}RS}(l)$$

is the number of subcarriers in OFDM symbol l carrying a PTRS.

$$M_{SC}^{UCI}(l)$$

is the number of resource elements that can be used for transmission of UCI in OFDM symbol l.

$$l = 0, 1, 2, \ldots, N_{symb,all}^{PUSCH} - 1$$

$$N_{symb,all}^{PUSCH}$$

is the total number of OFDM symbols, including all OFDM symbols used for DMRS.

For any OFDM symbol carrying the DMRS, $$M_{SC}^{UCI}(l) = 0.$$

For any OFDM symbol that does not carry the DMRS, $$M_{SC}^{UCI}(l) = M_{SC}^{PUSCH} - M_{SC}^{PT-RS}(l).$$

$\alpha$ is a parameter "scaling" configured by a higher layer.

(4) In a case that the CSI part 1 is multiplexed on a PUSCH without an UL-SCH, the number of coded symbols in each layer is calculated by the following formula 4:

formula 4

$$Q'_{CSI-1} = \min\left\{ \left\lceil \frac{(O_{CSI-1} + L_{CSI-1}) \cdot \beta_{offset}^{PUSCH}}{R \cdot Q_m} \right\rceil, \sum_{l=0}^{N_{symb,all}^{PUSCH}-1} M_{sc}^{UCI}(l) - Q'_{ACK} \right\}$$

$O_{CSI-1}$ is the number of bits for CSI part 1, if $O_{CSI-1} \geq 360$, $L_{CSI-1}=11$, otherwise $L_{CSI-1}$ is the number of CRC bits for CSI part 1.

$$\beta_{offset}^{PUSCH} = \beta_{offset}^{CSI-part1},$$

a value of the formula is $$I_{offset,0}^{CSI-1} \text{ or } I_{offset,1}^{CSI-1},$$

which is determined according to the actual number of bits for CSI part 1.

$$M_{sc}^{PT-RS}(l)$$

is the number of subcarriers in OFDM symbol l carrying a PTRS.

$$M_{sc}^{UCI}(l)$$

is the number of resource elements that can be used for transmission of UCI in OFDM symbol l.

$$l = 0, 1, 2, \ldots, N_{symb,all}^{PUSCH} - 1.$$

$$N_{symb,all}^{PUSCH}$$

is the total number of OFDM symbols, including all OFDM symbols used for DMRS.

For any OFDM symbol carrying the DMRS, $$M_{sc}^{UCI}(l) = 0.$$

For any OFDM symbol that does not carry the DMRS, $$M_{sc}^{UCI}(l) = M_{sc}^{PUSCH} - M_{sc}^{PT-RS}(l).$$

$\alpha$ is a parameter "scaling" configured by a higher layer.

R is a code rate of the PUSCH.

$Q_m$ is a modulation order of the PUSCH.

(5) In a case that the CSI part 2 is multiplexed on the PUSCH with an UL-SCH, the number of coded symbols in each layer is calculated by the following formula 5:

formula 5

$$Q'_{CSI-2} = \min\left\{ \left\lceil \frac{(O_{CSI-2} + L_{CSI-2}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=0}^{N_{symb,all}^{PUSCH}-1} M_{sc}^{UCI}(l) \right\rceil - Q'_{ACK} - Q'_{CSI-1} \right\}$$

$O_{CSI-2}$ is the number of bits for CSI part 2, if $O_{CSI-2} \geq 360$, $L_{CSI-2}=11$, otherwise $L_{CSI-2}$ is the number of CRC bits for CSI part 2.

$$\beta_{offest}^{PUSCH} = \beta_{offest}^{CSI-part2},$$

a value of the formula is $$I_{offest,0}^{CSI-2} \text{ or } I_{offest,1}^{CSI-2},$$

which is determined according to the actual number of bits for CSI part 1.

$C_{UL-SCH}$ is of the number of code blocks for UL-SCH. $K_r$ is a size of an $r^{th}$ code block.

$$M_{sc}^{PUSCH}$$

is a scheduling bandwidth for transmission of a PUSCH and is represented by the number of subcarriers.

$$M_{sc}^{PT-RS}(l)$$

is the number of subcarriers in OFDM symbol l carrying a PTRS.

$$M_{sc}^{UCI}(l)$$

is for the number of resource elements that can be used for transmission of UCI transmission in OFDM symbol l.

13

$$l = 0, 1, 2, \dots , N^{PUSCH}_{symb,all} - 1.$$

$$N^{PUSCH}_{symb,all}$$

is the total number of OFDM symbols, including all OFDM symbols used for DMRS.

For any OFDM symbol carrying the DMRS, $$M^{UCI}_{sc}(l) = 0.$$

For any OFDM symbol that does not carry the DMRS, $$M^{UCI}_{sc}(l) = M^{PUSCH}_{sc} - M^{PT-RS}_{sc}(l).$$

(6) In a case that the CSI part 2 is multiplexed on the PUSCH without an UL-SCH, the number of coded symbols in each layer is calculated by the following formula 6:

$$Q'_{CSI-2} = \sum_{l=0}^{M^{PUSCH}_{symb,all}-1} M^{UCI}_{sc}(l) - Q'_{ACK} - Q'_{CSI-1} \qquad \text{formula 6}$$

Step 505: Multiplex, according to the first resource, the first-priority UCI and the second-priority UCI on the PUSCH for transmission.

In this embodiment of this application, UCI with different priorities may be multiplexed on the PUSCH simultaneously, so that UCI with a low-priority service may be prevented from being discarded.

Referring to FIG. 6, an embodiment of this application provides a transmission method, executed by a terminal, and the method specifically includes: step 601 to step 606.

Step 601: Obtain first-priority UCI and second-priority UCI; and

Step 602: Determine a parameter set corresponding to the first-priority UCI and second-priority UCI, where the parameter set includes: a correspondence between an offset index and an offset indicator, or a correspondence among an offset index, an offset indicator, and a priority of UCI.

In some implementations, according to the priority of UCI and a priority of a PUSCH, the parameter set corresponding to the first-priority UCI and second-priority UCI is determined.

The parameter set may also be called a Beta offset set. For example, different parameter sets may be called a Beta offset set1, a beta offset set2, and the like.

In this embodiment of the present application, one or more parameter sets configured by a network side (such as through high-layer signaling) are obtained.

Step 603: Determine, according to high-layer configuration or an offset indicator indicated in the DCI, an offset index corresponding to the first-priority UCI and the second-priority UCI in the parameter set corresponding to the first-priority UCI and the second-priority UCI.

Step 604: Obtain, according to the offset index corresponding to the first-priority UCI and the second-priority UCI, and the number of bits of the UCI, a corresponding adjustment parameter of the first-priority UCI and the second-priority UCI.

Step 605: Calculate, according to the corresponding adjustment parameter of the first-priority UCI and the second-priority UCI, a first resource occupied by the first-priority UCI and the second priority UCI when multiplexed on the PUSCH.

Step 606: Multiplex, according to the first resource, the first-priority UCI and the second-priority UCI on the PUSCH for transmission.

In this embodiment of this application, UCI with different priorities may be multiplexed on the PUSCH simultaneously, so that UCI with a low-priority service may be prevented from being discarded.

Parameter sets in this embodiment of this application and configuration modes for all parameter sets are described below.

In a case that the first-priority UCI and the second-priority UCI are multiplexed on a first-priority or a second-priority PUSCH, Table 1 may be configured by the network:

TABLE 1

| | Correspondence between the priority of UCI, the priority of the PUSCH, and a parameter set | |
|---|---|---|
| | Target PUSCH | |
| To-be-multiplexed UCI | A priority indication field is 0 or no priority indication field is configured in DCI for scheduling the PUSCH, and the priority of the PUSCH configured by a higher layer is a low priority | A priority indication field is 1 in DCI for scheduling the PUSCH, and the priority of the PUSCH configured by a higher layer is a high priority |
| UCI corresponding to a low priority (corresponding to a priority indication field being 0 or no priority indication field being configured in DCI), or UCI configured with a low priority by a higher layer | Parameter set 1 (Beta offset set1) | Parameter set 3 (Beta offset set3) |
| UCI corresponding to a high priority (corresponding to a priority indication field being 1 in DCI), or UCI configured with a high priority by a higher layer | Parameter set 2 (Beta offset set2) | Parameter set 1 (Beta offset set1) |

The priority of the UCI configured by a higher layer includes a priority of a channel corresponding to the UCI and configured by the higher layer. For example, if the higher layer configures a Semi-Persistent Scheduling (SPS) Physical Downlink Shared CHannel (PDSCH) as a low priority, HARQ-ACK fed back by the SPS PDSCH is a low priority.

Figure 7:
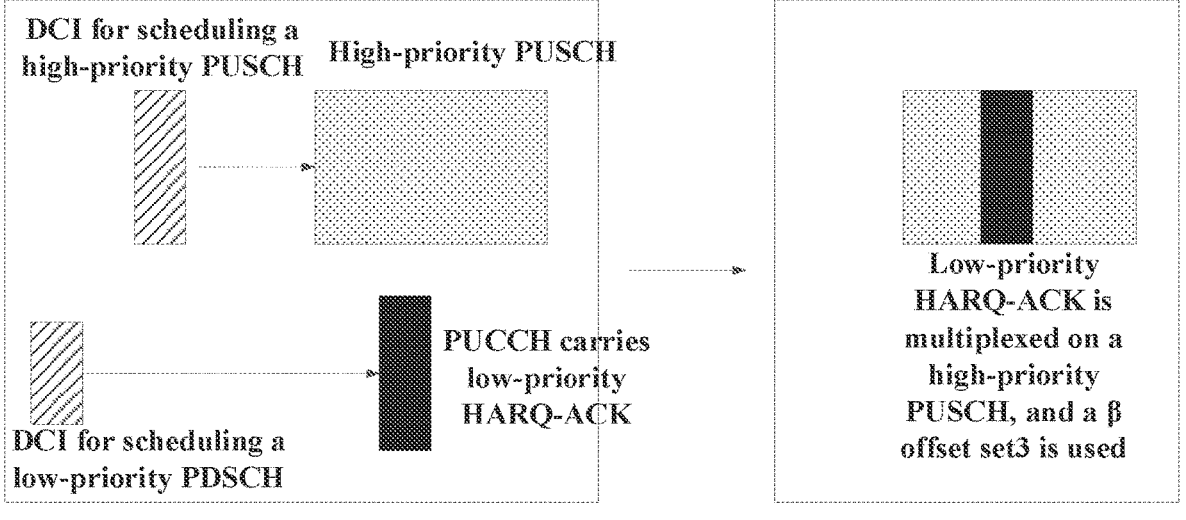
FIG. 7 is a schematic diagram of multiplexing a low-priority Hybrid Automatic Repeat reQuest ACKnowledgement (HARQ-ACK) to a high-priority PUSCH according to an embodiment of this application.

As shown in FIG. 7, a PUCCH corresponding to a second-priority HARQ-ACK conflicts with a PUSCH corresponding to a first priority, and the UE will calculate, by using a parameter in a Beta offset set3, RE occupied by the second-priority HARQ-ACK on the PUSCH.

In this embodiment of this application, a parameter set may include a first parameter and a second parameter, where the first parameter includes one or more first correspondences, and the second parameter indicates a correspondence between each of the first correspondences and the first-priority or second-priority UCI, where the first correspondence represents a correspondence between an offset index and an offset indicator.

Parameter sets including a parameter set 1 (Beta offset set1), a parameter set 2 (Beta offset set2), and a parameter set 3 (Beta offset set3) are used as an example below.

In some implementations, the parameter set 1 (Beta offset set1) in Table 1 may be configured in the form in Table 2.

TABLE 2

| Correspondence between an offset indicator (beta_offset indicator) and an offset index | |
|---|---|
| Offset indicator | $(I_{offset,0}^{HARQ-ACK}, I_{offset,1}^{HARQ-ACK}, \text{ or } I_{offset,2}^{HARQ-ACK}),$ $(I_{offset,0}^{CSI-1} \text{ or } I_{offset,0}^{CSI-2}), (I_{offset,1}^{CSI-1} \text{ or } I_{offset,1}^{CSI-2})$ |
| '00' | First offset index provided by a higher layer (1st offset index provided by higher layers) |
| '01' | Second offset index provided by a higher layer (2nd offset index provided by higher layers) |
| '10' | Third offset index provided by a higher layer (3rd offset index provided by higher layers) |
| '11' | Fourth offset index provided by a higher layer (4th offset index provided by higher layers) |

The offset indexes in this table are a multi-element set, that is, the offset indexes include multiple beta_offset values corresponding to HARQ, a CSI part 1, and a CSI part 2, which are configured by the higher layer. In DCI, the offset index is indicated by the beta_offset indicator.

In some implementations, the parameter set 2 (Beta offset set2) in Table 1 may be configured in the form in Table 3.

TABLE 3

| Correspondence among an offset indicator (beta_offset indicator), an offset index, and a priority of UCI | | |
|---|---|---|
| | UCI corresponding to a low priority or not configured with a priority indication field, or UCI configured with a low priority by a higher layer | UCI corresponding to a high priority or configured with a high priority by a higher layer |
| Offset indicator | $(I_{offset,0}^{HARQ-ACK}, I_{offset,1}^{HARQ-ACK}, \text{ or } I_{offset,2}^{HARQ-ACK}),$ $(I_{offset,0}^{CSI-1} \text{ or } I_{offset,0}^{CSI-2}), (I_{offset,1}^{CSI-1} \text{ or } I_{offset,1}^{CSI-2})$ | $(I_{offset,0}^{HARQ-ACK}, I_{offset,1}^{HARQ-ACK}, \text{ or } I_{offset,2}^{HARQ-ACK}),$ $(I_{offset,0}^{CSI-1} \text{ or } I_{offset,0}^{CSI-2}), (I_{offset,1}^{CSI-1} \text{ or } I_{offset,1}^{CSI-2})$ |
| '00' | First offset index provided by a higher layer (1st offset index provided by higher layers) | Fifth offset index provided by a higher layer (5th offset index provided by higher layers) |
| '01' | Second offset index provided by a higher layer (2nd offset index provided by higher layers) | Sixth offset index provided by a higher layer (6th offset index provided by higher layers) |
| '10' | Third offset index provided by a higher layer (3rd offset index provided by higher layers) | Seventh offset index provided by a higher layer (7th offset index provided by higher layers) |
| '11' | Fourth offset index provided by a higher layer (4th offset index provided by higher layers) | Eighth offset index provided by a higher layer (8th offset index provided by higher layers) |

That is, in a case that low-priority UCI is multiplexed on high-priority PUSCH, the first offset index to fourth offset index indicated by the DCI are used. That is, in a case that high-priority UCI is multiplexed on high-priority PUSCH, the fifth offset index to eighth offset index indicated by the DCI are used.

This way, the network may dynamically indicate whether to multiplex UCI with a certain priority to a PUSCH with a certain priority. For example, if an adjustment parameter indicated by a value of an offset index with a certain priority configured by the network is 0, the UE will use 0 RE for the UCI on the PUSCH, that is, no multiplexing.

In some implementations, the parameter set 3 (Beta offset set3) in Table 1 may be configured in the form in Table 4.

TABLE 4

Correspondence among an offset indicator (beta_offset indicator), an offset index, and a priority of UCI

| | UCI with a high priority or configured with a high priority by higher layer | UCI with a low priority, or not configured with a priority indication field, or configured with a low priority by a higher layer, |
|---|---|---|
| Offset indicator | $(I_{offset,0}^{HARQ-ACK}, I_{offset,1}^{HARQ-ACK}, \text{ or } I_{offset,2}^{HARQ-ACK})$, $(I_{offset,0}^{CSI-1} \text{ or } I_{offset,0}^{CSI-2}), (I_{offset,1}^{CSI-1} \text{ or } I_{offset,1}^{CSI-2})$ | $(I_{offset,0}^{HARQ-ACK}, I_{offset,1}^{HARQ-ACK}, \text{ or } I_{offset,2}^{HARQ-ACK})$, $(I_{offset,0}^{CSI-1} \text{ or } I_{offset,0}^{CSI-2}), (I_{offset,1}^{CSI-1} \text{ or } I_{offset,1}^{CSI-2})$ |
| '00' | First offset index provided by a higher layer (1st offset index provided by higher layers) | Fifth offset index provided by a higher layer (5th offset index provided by higher layers) |
| '01' | Second offset index provided by a higher layer (2nd offset index provided by higher layers) | Sixth offset index provided by a higher layer (6th offset index provided by higher layers) |
| '10' | Third offset index provided by a higher layer (3rd offset index provided by higher layers) | Seventh offset index provided by a higher layer (7th offset index provided by higher layers) |
| '11' | Fourth offset index provided by a higher layer (4th offset index provided by higher layers) | Eighth offset index provided by a higher layer (8th offset index provided by higher layers) |

For example:

For each offset index configured by the higher layer in the table, the network will configure 7 values, respectively corresponding to $$I_{offset,0}^{HARQ-ACK}, I_{offest,1}^{HARQ-ACK}, I_{offest,2}^{HARQ-ACK}, I_{offest,0}^{CSI-1}, I_{offest,0}^{CSI-2}, I_{offest,1}^{CSI-1}, I_{offest,1}^{CSI-2}.$$

If UCI that the UE needs to multiplex on a PUSCH at a moment includes HARQ-ACK with 3 bits, a CSI part 1 with 15 bits, and a CSI part 2 with 20 bits, the UE will choose $$I_{offest,1}^{HARQ-ACK}, I_{offest,1}^{CSI-1}, \text{ and } I_{offest,1}^{CSI-2},$$

and calculate, according to the foregoing formulas 1 to 6, the number of bits occupied by the UCI.

$$I_{offest,1}^{HARQ-ACK}, I_{offest,1}^{CS1-1}, \text{ and } I_{offest,1}^{CSI-2}$$

are used to respectively replace $$\beta_{offest}^{PUSCH}$$

in a corresponding formula.

In a case that the beta_offset indicator in the table indicates "01," if the Beta offset set3 may be indicated by DCI for scheduling the high-priority PUSCH, the UE will use the second offset index to calculate a resource occupied by the high-priority UCI, and the sixth offset index to calculate a resource occupied by the low-priority UCI.

The second offset index indicates seven values:

$$\{I_{offest,0}^{HARQ-ACK}, I_{offest,1}^{HARQ-ACK}, I_{offest,2}^{HARQ-ACK}, I_{offest,0}^{CSI-1}, I_{offest,0}^{CSI-2}, I_{offest,1}^{CSI-1}, I_{offest,1}^{CSI-2}\}.$$

The sixth offset index indicates the other seven values:

$$\{I_{offest,0}^{HARQ-ACK}, I_{offest,1}^{HARQ-ACK}, I_{offest,2}^{HARQ-ACK}, I_{offest,0}^{CSI-1}, I_{offest,0}^{CSI-2}, I_{offest,1}^{CSI-1}, I_{offest,1}^{CSI-2}\}.$$

Seven values indicated by the second offset index and seven values indicated by the sixth offset index may be the same or different.

In this embodiment of this application, a parameter set may include a first parameter and a second parameter, where the first parameter indicates a correspondence between the first-priority UCI and the first correspondence, and the second parameter indicates a correspondence between the second-priority UCI and the first correspondence, where the first correspondence represents a correspondence between the offset index and the offset indicator.

In an implementation, the network may configure a parameter set (Beta offset set) in Table 1 as follows:

Beta Offset Parameter Set {Parameter A, Parameter B}.

The parameter A indicates which correspondences (or tables) are used, and the parameter B indicates a correspondence between each correspondence (or table) and a priority.

For example, the parameter A indicates {table M, table N}, representing using table M and table N, and the parameter B indicates (first priority, second priority), representing that table M is for the first priority and table N is for the second priority.

In another implementation, the network may configure a parameter set (Beta offset parameter set) in Table 1 as follows:

Beta offset parameter set ((high priority: table A), (low priority: table B)).

That is, the parameter table A is used for multiplexing the high-priority UCI; and the parameter table B is used for multiplexing the low-priority UCI.

For example, Table 5 and Table 7 are introduced with the correspondences as tables as follows.

TABLE 5

| Correspondence between an offset indicator (beta_offset indicator) and an offset index | |
|---|---|
| Offset indicator | $(I_{offset,0}^{HARQ-ACK}, I_{offset,1}^{HARQ-ACK}, \text{ or } I_{offset,2}^{HARQ-ACK})$, $(I_{offset,0}^{CSI-1} \text{ or } I_{offset,0}^{CSI-2}), (I_{offset,1}^{CSI-1} \text{ or } I_{offset,1}^{CSI-2})$ |
| '00' | First offset index provided by a higher layer (1st offset index provided by higher layers) |
| '01' | Second offset index provided by a higher layer (2nd offset index provided by higher layers) |
| '10' | Third offset index provided by a higher layer (3rd offset index provided by higher layers) |
| '11' | Fourth offset index provided by a higher layer (4th offset index provided by higher layers) |

TABLE 6

| Correspondence between an offset indicator (beta_offset indicator) and an offset index | |
|---|---|
| Offset indicator | $(I_{offset,0}^{HARQ-ACK}, I_{offset,1}^{HARQ-ACK}, \text{ or } I_{offset,2}^{HARQ-ACK})$, $(I_{offset,0}^{CSI-1} \text{ or } I_{offset,0}^{CSI-2}), (I_{offset,1}^{CSI-1} \text{ or } I_{offset,1}^{CSI-2})$ |
| '00' | Fifth offset index provided by a higher layer (5th offset index provided by higher layers) |
| '01' | Sixth offset index provided by a higher layer (6th offset index provided by higher layers) |
| '10' | Seventh offset index provided by a higher layer (7th offset index provided by higher layers) |
| '11' | Eighth offset index provided by a higher layer (8th offset index provided by higher layers) |

TABLE 7

| Correspondence between an offset indicator (beta_offset indicator) and an offset index | |
|---|---|
| Offset indicator | $(I_{offset,0}^{HARQ-ACK}, I_{offset,1}^{HARQ-ACK}, \text{ or } I_{offset,2}^{HARQ-ACK})$, $(I_{offset,0}^{CSI-1} \text{ or } I_{offset,0}^{CSI-2}), (I_{offset,1}^{CSI-1} \text{ or } I_{offset,1}^{CSI-2})$ |
| '00' | Ninth offset index provided by a higher layer (9th offset index provided by higher layers) |
| '01' | Tenth offset index provided by a higher layer (10th offset index provided by higher layers) |
| '10' | Eleventh offset index provided by a higher layer (11th offset index provided by higher layers) |
| '11' | Twelfth offset index provided by a higher layer (12th offset index provided by higher layers) |

It can be understood that the number of code points of an offset indicator (beta_offset indicator) (or the number of bits of a signaling indicator) is determined according to the number of values configured by the network.

Figure 8:
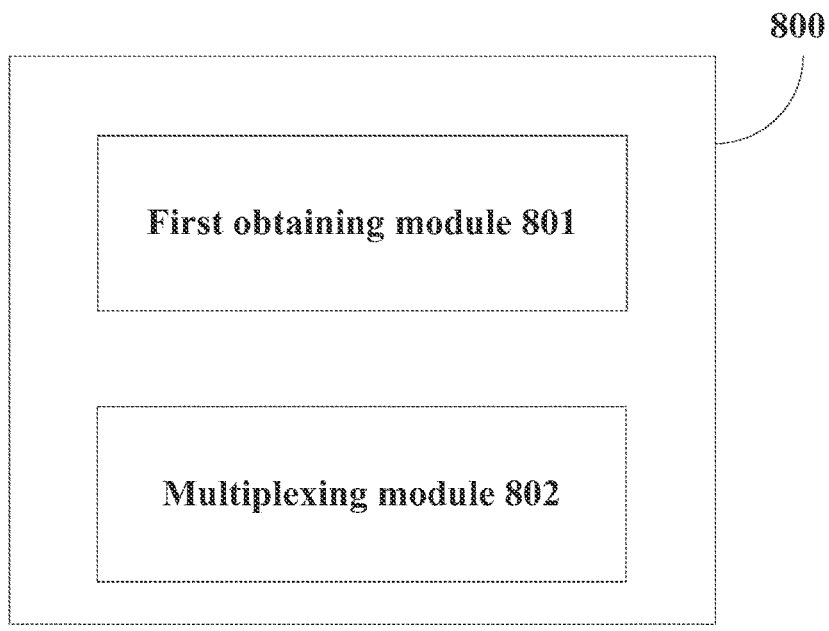
FIG. 8 is a schematic diagram of a transmission apparatus according to an embodiment of this application.

Referring to FIG. 8, an embodiment of this application provides a transmission apparatus, applied to a terminal. The apparatus 800 includes:

a first obtaining module 801, configured to obtain first-priority UCI and second priority-UCI; and a multiplexing module 802, configured to multiplex the first-priority UCI and the second-priority UCI on a PUSCH for transmission, where apriority of the PUSCH is a first priority or a second priority.

In this embodiment of this application, the multiplexing module 802 includes:

a processing unit, configured to obtain, according to higher layer configuration or an offset indicator in DCI for scheduling the PUSCH, a first resource occupied by the first-priority UCI and the second-priority UCI when multiplexed on the PUSCH; and a multiplexing unit, configured to multiplex, according to the first resource, the first-priority UCI and the second-priority UCI on the PUSCH for transmission.

In this embodiment of this application, the processing unit includes:

a first determining subunit, configured to determine, according to an offset indicator in DCI for the PUSCH, an offset index corresponding to the first-priority UCI and the second-priority UCI, where the offset index corresponds to one or more adjustment parameters, and the adjustment parameters are used to adjust a resource, occupied by UCI, on the PUSCH;

a second determining subunit, configured to determine, according to the offset index corresponding to the first-priority UCI and the second-priority UCI and the number of bits of the first-priority UCI and the second-priority UCI, a corresponding adjustment parameter of the first-priority UCI and the second-priority UCI;

and a computing subunit, configured to calculate, according to the corresponding adjustment parameter of the first-priority UCI and the second-priority UCI, the first resource occupied by the first-priority UCI and the second priority UCI when multiplexed on the PUSCH.

In this embodiment of this application, the first determining subunit includes:

a second determining subunit, configured to determine a parameter set corresponding to the first-priority UCI and second-priority UCI, where the parameter set includes: a correspondence between an offset index and an offset indicator, or a correspondence among an offset index, an offset indicator, and a priority of UCI; and a third determining subunit, configured to determine, according to the offset indicator indicated in the DCI, the offset index corresponding to the first-priority UCI and the second-priority UCI in the parameter set corresponding to the first-priority UCI and the second-priority UCI.

In some implementations, the second determining subunit is further configured to determine, according to the priority of UCI and a priority of the PUSCH, the parameter set corresponding to the first-priority UCI and second-priority UCI.

In this embodiment of this application, the parameter set includes a first parameter and a second parameter, where the first parameter includes one or more first correspondences, and the second parameter indicates a correspondence between each of the first correspondences and the first-priority or second-priority UCI, or the first parameter indicates a correspondence between the first-priority UCI and the first correspondence, and the second parameter indicates a correspondence between the second-priority UCI and the first correspondence, where the first correspondence represents a correspondence between the offset index and the offset indicator.

In this embodiment of this application, the apparatus 800 further includes:

a second obtaining module, configured to obtain one or more of the parameter sets configured by a network side.

In this embodiment of this application, a priority index of the PUSCH is indicated by a priority indication field of the DCI, or the priority of the PUSCH is configured by a higher layer.

The transmission apparatus provided in the embodiments of this application can implement processes implemented in the method embodiment of FIG. 3, FIG. 4, FIG. 5, and FIG. 6, and a same technical effect is achieved. To avoid repetition, details are not described herein again.

Figure 9:
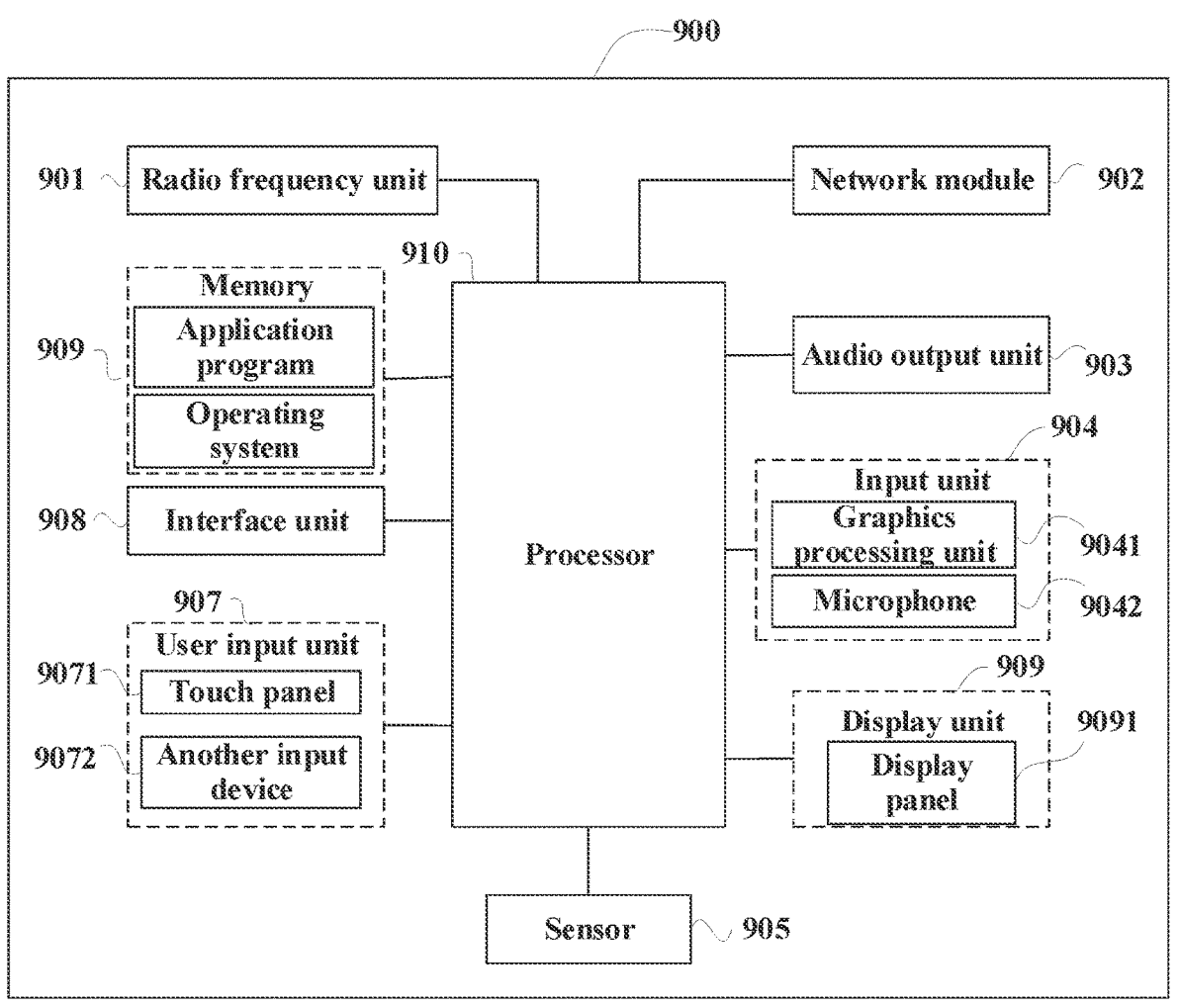
FIG. 9 is a schematic diagram of a terminal according to an embodiment of this application.

FIG. 9 is a schematic diagram of a hardware structure of a terminal according to an embodiment of this application.

The terminal 900 includes but is not limited to components such as a radio frequency unit 901, a network module 902, an audio output unit 903, an input unit 904, a sensor 905, a display unit 906, a user input unit 907, an interface unit 908, a memory 909, and a processor 910.

It may be understood by a person skilled in the art that the terminal 900 may further include a power supply (such as a battery) that supplies power to each component. The power supply may be logically connected to the processor 910 by using a power management system, to implement functions such as charging, discharging, and power consumption management by using the power management system. The terminal structure shown in FIG. 9 constitutes no limitation on the terminal, and the terminal may include more or fewer components than those shown in the figure, or combine some components, or have different component arrangements. Details are not described herein.

It should be understood that, in the embodiments of this application, the input unit 904 may include a Graphics Processing Unit (GPU) 9041 and a microphone 9042, and the graphics processing unit 9041 processes image data of a still picture or video obtained by an image capture apparatus (such as a camera) in a video capture mode or an image capture mode. The display unit 906 may include a display panel 9061, and the display panel 9061 may be configured in a form of a liquid crystal display, an organic light-emitting diode, or the like. The user input unit 907 includes a touch panel 9071 and another input device 9072. The touch panel 9071 is also referred to as a touchscreen. The touch panel 9071 may include two parts: a touch detection apparatus and a touch controller. The another input device 9072 may include but is not limited to a physical keyboard, a functional button (such as a volume control button or a power on/off button), a trackball, a mouse, and a joystick. Details are not described herein.

In this embodiment of this application, the radio frequency unit 901 receives downlink data from a network side device and then sends the downlink data to the processor 910 for processing; and sends uplink data to the network side device. Usually, the radio frequency unit 901 includes but is not limited to an antenna, at least one amplifier, a transceiver, a coupler, a low noise amplifier, a duplexer, and the like.

The memory 909 may be configured to store a software program or an instruction and various pieces of data. The memory 909 may mainly include a program or instruction storage area and a data storage area. The program or instruction storage area may store an operating system, and an application or an instruction required by at least one function (for example, a sound playing function or an image playing function). In addition, the memory 909 may include a high-speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory. For example, at least one disk storage component, a flash memory component, or another non-volatile solid-state storage component.

The processor 910 may include one or more processing units. In some implementations, an application processor and a modem processor may be integrated into the processor 910. The application processor mainly processes an operating system, a user interface, an application, an instruction, or the like. The modem processor mainly processes wireless communications, for example, a baseband processor. It can be understood that, alternatively, the modem processor may not be integrated into the processor 910.

The terminal provided in the embodiments of this application can implement processes implemented in the method embodiments in FIG. 3, FIG. 4, FIG. 5, and FIG. 6, and a same technical effect can be achieved. To avoid repetition, details are not described herein again.

An embodiment of this application further provides a program product, where the program product is stored in a non-volatile storage medium; and the program product is executed by at least one processor to implement the steps of the processing method described in FIG. 3, FIG. 4, FIG. 5, and FIG. 6.

An embodiment of this application further provides a readable storage medium, where the readable storage medium stores a program or an instruction, and when the program or the instruction is executed by a processor, the processes of the method embodiments in FIG. 3, FIG. 4, FIG. 5, or FIG. 6 are implemented, and a same technical effect can be achieved. To avoid repetition, details are not described herein.

The processor is a processor in the terminal in the foregoing embodiment. The readable storage medium includes a computer-readable storage medium such as a ROM, a Random Access Memory (RAM), a magnetic disk, an optical disc, or the like.

An embodiment of this application further provides a chip, where the chip includes a processor and a communications interface, the communications interface is coupled to the processor, and the processor is configured to run a program or an instruction of a network side device to implement the processes of the method embodiment described in FIG. 3, FIG. 4, FIG. 5, and FIG. 6, and a same technical effect can be achieved. To avoid repetition, details are not described herein again.

It should be understood that the chip mentioned in the embodiment of this application can also be called a system-level chip, a system chip, a chip system, or a system on chip.

It can be understood that the embodiments described in the present disclosure may be implemented by hardware, software, firmware, middleware, microcode, or a combination thereof. For implementation with hardware, the module, unit, submodule, subunit, and the like may be implemented in one or more Application Specific Integrated Circuits (ASIC), a Digital Signal Processing (DSP), a DSP Device (DSPD), a Programmable Logic Device (PLD), a Field-Programmable Gate Array (FPGA), a general-purpose processor, a controller, a microcontroller, a microprocessor, another electronic unit for implementing the functions of this application, or a combination thereof.

It should be noted that, in this specification, the terms "include," "comprise," or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the methods and apparatuses in the embodiments of this application is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

Based on the descriptions of the foregoing implementation manners, a person skilled in the art may clearly understand that the method in the foregoing embodiment may be implemented by software in addition to a necessary universal hardware platform or by hardware only. Based on such understanding, the technical solutions of this application essentially, or the part contributing to the prior art may be implemented in a form of a software product. The computer software product is stored in a storage medium (for example, a ROM/RAM, a magnetic disk, or a compact disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementation manners. The foregoing specific implementation manners are merely schematic instead of restrictive. Under enlightenment of this application, a person of ordinary skills in the art may make many forms without departing from aims and the protection scope of claims of this application, all of which fall within the protection scope of this application.

The invention claimed is:

1. A transmission method, performed by a terminal, wherein the method comprises:

obtaining first-priority Uplink Control Information (UCI) and second-priority UCI; and multiplexing the first-priority UCI and the second-priority UCI on a Physical Uplink Shared CHannel (PUSCH) for transmission, wherein a priority of the PUSCH is a first priority or a second priority, wherein multiplexing the first-priority UCI and the second-priority UCI on the PUSCH for transmission comprises:

determining, according to a high layer configuration or an offset indicator in Downlink Control Information (DCI) for scheduling the PUSCH, an offset index corresponding to the first-priority UCI and the second-priority UCI, wherein one offset index corresponds to a plurality of adjustment parameters of the first-priority UCI and a plurality of adjustment parameters of the second-priority UCI, and the adjustment parameters are used to calculate a number of coded symbols occupied by UCI on the PUSCH;

obtaining, according to the offset index and a number of bits corresponding to the first-priority UCI and the second-priority UCI, a corresponding adjustment parameter of the first-priority UCI and a corresponding adjustment parameter of the second-priority UCI, respectively, when the first-priority UCI and the second-priority UCI are multiplexed on the PUSCH;

calculating, according to the corresponding adjustment parameter of the first-priority UCI and the corresponding adjustment parameter of the second-priority UCI, a first number of coded symbols occupied by the first-priority UCI and a second number of coded symbols occupied by the second-priority UCI, respectively; and multiplexing, according to the first number of coded symbols occupied by the first-priority UCI and the second number of coded symbols occupied by the second-priority UCI, the first-priority UCI and the second-priority UCI on the PUSCH for transmission.

2. The method according to claim 1, further comprising:

obtaining, according to the higher layer configuration or the offset indicator in the DCI for scheduling the PUSCH, the first number of coded symbols occupied by the first-priority UCI and the second number of coded symbols occupied by the second-priority UCI, respectively, when multiplexed on the PUSCH.

3. The method according to claim 1, wherein determining, according to the high layer configuration or the offset indicator in the DCI for the PUSCH, the offset index corresponding to the first-priority UCI and the second-priority UCI comprises:

determining a parameter set corresponding to the first-priority UCI and the second-priority UCI, wherein the parameter set comprises: a correspondence between the offset index and the offset indicator, or a correspondence among the offset index, the offset indicator, and a priority of UCI; and determining, according to the high-layer configuration or the offset indicator indicated in the DCI, the offset index corresponding to the first-priority UCI and the second-priority UCI in the parameter set corresponding to the first-priority UCI and the second-priority UCI.

4. The method according to claim 3, wherein the parameter set comprises a first parameter and a second parameter, wherein the first parameter comprises one or more first correspondences, and the second parameter indicates a correspondence between each of the first correspondences and the first-priority or second-priority UCI, or the first parameter indicates a correspondence between the first-priority UCI and the first correspondence, and the second parameter indicates a correspondence between the second-priority UCI and the first correspondence, wherein the first correspondence represents a correspondence between the offset index and the offset indicator.

5. The method according to claim 3, wherein the determining a parameter set corresponding to the first-priority UCI and the second-priority UCI comprises:

determining, according to the priority of UCI and the priority of the PUSCH, the parameter set corresponding to the first-priority UCI and the second-priority UCI.

6. The method according to claim 3, further comprising: obtaining the parameter set configured by a network side.

7. The method according to claim 1, wherein a priority index of the PUSCH is indicated by a priority indication field of DCI for scheduling the PUSCH, or the priority of the PUSCH is configured by a higher layer.

8. A terminal, comprising:

a memory storing computer-readable instructions; and a processor coupled to the memory and configured to execute the computer-readable instructions, wherein the computer-readable instructions, when executed by the processor, cause the processor to perform operations comprising:

obtaining first-priority Uplink Control Information (UCI) and second-priority UCI; and multiplexing the first-priority UCI and the second-priority UCI on a Physical Uplink Shared CHannel (PUSCH) for transmission, wherein a priority of the PUSCH is a first priority or a second priority, wherein multiplexing the first-priority UCI and the second-priority UCI on the PUSCH for transmission comprises:

determining, according to a high layer configuration or an offset indicator in Downlink Control Information (DCI) for scheduling the PUSCH, an offset index corresponding to the first-priority UCI and the second-priority UCI, wherein one offset index corresponds to a plurality of adjustment parameters of the first-priority UCI and a plurality of adjustment parameters of the second-priority UCI, and the adjustment parameters are used to calculate a number of coded symbols occupied by UCI on the PUSCH;

obtaining, according to the offset index and a number of bits corresponding to the first-priority UCI and the second-priority UCI, a corresponding adjustment parameter of the first-priority UCI and a corresponding adjustment parameter of the second-priority UCI, respectively, when the first-priority UCI and the second-priority UCI are multiplexed on the PUSCH;

calculating, according to the corresponding adjustment parameter of the first-priority UCI and the corresponding adjustment parameter of the second-priority UCI, a first number of coded symbols occupied by the first-priority UCI and a second number of coded symbols occupied by the second-priority UCI, respectively; and multiplexing, according to the first number of coded symbols occupied by the first-priority UCI and the second number of symbols occupied by the second-priority UCI, the first-priority UCI and the second-priority UCI on the PUSCH for transmission.

9. The terminal according to claim 8, wherein the operations further comprise:

obtaining, according to the higher layer configuration or the offset indicator in the DCI for scheduling the PUSCH, the first number of coded symbols occupied by the first-priority UCI and the second number of symbols occupied by the second-priority UCI, respectively, when multiplexed on the PUSCH.

10. The terminal according to claim 8, wherein the determining, according to the high layer configuration or the offset indicator in the DCI for the PUSCH, the offset index corresponding to the first-priority UCI and the second-priority UCI comprises:

determining a parameter set corresponding to the first-priority UCI and the second-priority UCI, wherein the parameter set comprises: a correspondence between the offset index and the offset indicator, or a correspondence among the offset index, the offset indicator, and a priority of UCI; and determining, according to the high-layer configuration or the offset indicator indicated in the DCI, the offset index corresponding to the first-priority UCI and the second-priority UCI in the parameter set corresponding to the first-priority UCI and the second-priority UCI.

11. The terminal according to claim 10, wherein the parameter set comprises a first parameter and a second parameter, wherein the first parameter comprises one or more first correspondences, and the second parameter indicates a correspondence between each of the first correspondences and the first-priority or second-priority UCI, or the first parameter indicates a correspondence between the first-priority UCI and the first correspondence, and the second parameter indicates a correspondence between the second-priority UCI and the first correspondence, wherein the first correspondence represents a correspondence between the offset index and the offset indicator.

12. The terminal according to claim 10, wherein the determining a parameter set corresponding to the first-priority UCI and the second-priority UCI comprises:

determining, according to the priority of UCI and the priority of the PUSCH, the parameter set corresponding to the first-priority UCI and the second-priority UCI.

13. The terminal according to claim 10, wherein the operations further comprise:

obtaining the parameter set configured by a network side.

14. The terminal according to claim 8, wherein a priority index of the PUSCH is indicated by a priority indication field of DCI for scheduling the PUSCH, or the priority of the PUSCH is configured by a higher layer.

15. A non-transitory computer-readable medium storing instructions that, when executed by a processor, cause the processor to perform operations comprising:

obtaining first-priority Uplink Control Information (UCI) and second-priority UCI; and multiplexing the first-priority UCI and the second-priority UCI on a Physical Uplink Shared CHannel (PUSCH) for transmission, wherein a priority of the PUSCH is a first priority or a second priority, wherein multiplexing the first-priority UCI and the second-priority UCI on the PUSCH for transmission comprises:

determining, according to a high layer configuration or an offset indicator in Downlink Control Information (DCI) for scheduling the PUSCH, an offset index corresponding to the first-priority UCI and the second-priority UCI, wherein one offset index corresponds to a plurality of adjustment parameters of the first-priority UCI and a plurality of adjustment parameters of the second-priority UCI, and the adjustment parameters are used to calculate a number of coded symbols occupied by UCI on the PUSCH;

obtaining, according to the offset index and a number of bits corresponding to the first-priority UCI and the second-priority UCI, a corresponding adjustment parameter of the first-priority UCI and a corresponding adjustment parameter of the second-priority UCI, respectively, when the first-priority UCI and the second-priority UCI are multiplexed on the PUSCH;

calculating, according to the corresponding adjustment parameter of the first-priority UCI and the corresponding adjustment parameter of the second-priority UCI, a first number of coded symbols occupied by the first-priority UCI and a second number of coded symbols occupied by the second-priority UCI, respectively; and multiplexing, according to the first number of coded symbols occupied by the first-priority UCI and the second number of coded symbols occupied by the second-priority UCI, the first-priority UCI and the second-priority UCI on the PUSCH for transmission.

16. The non-transitory computer-readable medium according to claim 15, wherein the operations further comprise:

obtaining, according to the higher layer configuration or the offset indicator in the DCI for scheduling the PUSCH, the first number of coded symbols occupied by the first-priority UCI and the second number of symbols occupied by the second-priority UCI, respectively, when multiplexed on the PUSCH.

17. The non-transitory computer-readable medium according to claim 15, wherein determining, according to the high layer configuration or the offset indicator in the DCI for the PUSCH, the offset index corresponding to the first-priority UCI and the second-priority UCI comprises:

determining a parameter set corresponding to the first-priority UCI and the second-priority UCI, wherein the parameter set comprises: a correspondence between the offset index and the offset indicator, or a correspondence among the offset index, the offset indicator, and a priority of UCI; and determining, according to the high-layer configuration or the offset indicator indicated in the DCI, the offset index corresponding to the first-priority UCI and the second-priority UCI in the parameter set corresponding to the first-priority UCI and the second-priority UCI.

18. The non-transitory computer-readable medium according to claim 17, wherein the parameter set comprises a first parameter and a second parameter, wherein the first parameter comprises one or more first correspondences, and the second parameter indicates a correspondence between each of the first correspondences and the first-priority or second-priority UCI, or the first parameter indicates a correspondence between the first-priority UCI and the first correspondence, and the second parameter indicates a correspondence between the second-priority UCI and the first correspondence, wherein the first correspondence represents a correspondence between the offset index and the offset indicator.

19. The non-transitory computer-readable medium according to claim 17, wherein determining the parameter set corresponding to the first-priority UCI and the second-priority UCI comprises:

determining, according to the priority of UCI and the priority of the PUSCH, the parameter set corresponding to the first-priority UCI and the second-priority UCI.

20. The non-transitory computer-readable medium according to claim 17, wherein the operations further comprise:

obtaining the parameter set configured by a network side.

* * * * *